United States Patent
Krieger et al.

(10) Patent No.: US 6,930,469 B2
(45) Date of Patent: Aug. 16, 2005

(54) BATTERY CHARGER WITH A TIMED HIGH-CURRENT STAGE

(75) Inventors: Michael Krieger, Miami Beach, FL (US); Bruce Randolph, Ft. Lauderdale, FL (US)

(73) Assignee: Vector Products, Inc., Ft. Lauderdale, FL (US)

( * ) Notice: Subject to any disclaimer, the term of this patent is extended or adjusted under 35 U.S.C. 154(b) by 208 days.

(21) Appl. No.: 10/617,189

(22) Filed: Jul. 10, 2003

(65) Prior Publication Data

US 2005/0007072 A1 Jan. 13, 2005

(51) Int. Cl.$^7$ .................... H01M 10/44; H01M 10/46
(52) U.S. Cl. ............................................. 320/160
(58) Field of Search .................... 320/127, 128, 320/130, 135, 139, 141, 155, 160

(56) References Cited

U.S. PATENT DOCUMENTS

| | | | |
|---|---|---|---|
| 4,146,830 A | * | 3/1979 | Foster .................. 320/160 |
| 5,633,576 A | * | 5/1997 | Rose et al. ............ 320/160 |
| 6,252,373 B1 | * | 6/2001 | Stefansson et al. ..... 320/160 |
| 6,480,399 B2 | | 11/2002 | Balakrishman et al. |

OTHER PUBLICATIONS

Design Idea DI–12, Topswitch–GX 16 W, Universal Input, Lead Acid Battery Charger, Nov. 2002.
Engineering Prototype Report (EPR–00010), Power Integrations, Inc. (Nov. 14 ,2000).
Electricity—Voltage and Current—Teacher's Notes, http://www.reprise.com/host/electricity/voltage_notes.asp, Mar. 26, 2003.
Circuit Components: the Capacitor, http://www.play–hockey.com/dc_theory/components_capacitors.html, Mar. 26, 2003.
555 Timer Tutorial, http:www//uoguelph.ca/~antoon/gadgets/555/555.html, Mar. 19, 2003.
C–Rate, http://www.allegromicro.com/techpub2/cadex/index332.htm, Apr. 3, 2003.
Electrochemical Systems Glossary C, http://voltaicpower.com/GlossaryLetters/Glossary–C.htm, Apr. 3, 2003.
Battery Capacity and Electromotive Force, http:/voltaicpower.com/Batteries/Capacity.htm, Apr. 3, 2003.
EE Times—Battery Capacity Monitoring Goes Beyond the Voltmeter, http://www.eetimes.com/in_focus/mixed_signals/OEG20020709S0017, Apr. 3, 2003.
Battery Capacity, http://www.techlib.com/reference/batteries.html, Apr. 3, 2003.

* cited by examiner

*Primary Examiner*—Edward H. Tso
(74) *Attorney, Agent, or Firm*—Robert Kinberg; Jeffri A. Kaminski

(57) ABSTRACT

A battery charger includes a supply voltage unit supplying a power supply voltage, a constant current generator receiving the power supply voltage and outputting a substantially constant current, and a timer whose output is coupled to the constant current generator. The timer outputs the timer output in response to a transition in the power supply voltage. The supply voltage unit changes a magnitude of the power supply voltage in response to the timer output so that the substantially constant current is changed from a first current level to a second current level.

20 Claims, 2 Drawing Sheets

BATTERY CHARGER WITH A TIMED HIGH-CURRENT STAGE

FIELD OF THE INVENTION

The present invention relates to a battery charger with a timer.

BACKGROUND OF THE INVENTION

In recharging a battery, it is a common practice to supply a small current as the charging current over an extended period of time in order to reduce the effects of self-heating associated with the charging process. For example, in charging most lead acid batteries, a charge current rate of approximately 0.1 C is applied for most of the charging cycle in order to avoid overheating ("C" is used here in the sense of "C-rate," a measurement of the charge/discharge capacity of a battery; for example, if a battery rated at 1 Ah (ampere-hour) is discharged at its 1C rate, it will provide 1 A for one hour, while at its 0.1 C rate, it will provide 0.1 A for ten hours). In contrast, if one attempts to use too high of a current early in the process of charging a battery, overheating can occur, which may cause damage to the battery. The drawback, however, to use of small current levels early in charging is that the battery is typically useless for a long period of time, due to the fact that it absorbs very little charge during the initial (low-current) charging period.

What is needed, therefore, is an improved battery charger that overcomes the shortcoming of having the battery be useless for such a long period of time at the beginning of the charge cycle.

SUMMARY OF THE INVENTION

Applicants note that it is possible, if only done for a short time, to apply a very high current to a rechargeable battery without causing overheating. Applicants propose, therefore, to initially supply a large current, for a short period, and to subsequently decrease the current in order to avoid overheating. In this manner, the above shortcomings will be overcome, and the charging time will be shortened.

A battery charger according to the present invention includes a supply voltage unit supplying a power supply voltage, a constant current generator receiving the power supply voltage and outputting a substantially constant current, and a timer coupled to the power supply voltage. The timer outputs a timer output after a substantially fixed time delay from a time that the power supply voltage exceeds a substantially fixed threshold voltage. The supply voltage unit changes a magnitude of the power supply voltage in response to the timer output so that the substantially constant current is changed from a first current level to a second current level.

BRIEF DESCRIPTION OF THE DRAWINGS

The invention will become apparent from the following, more particular description of an embodiment of the invention, taken in conjunction with the accompanying drawings, in which.

DETAILED DESCRIPTION OF THE INVENTION

An exemplary embodiment of the invention is discussed in detail below. In describing the embodiment and its variations, specific terminology is employed for the sake of clarity. However, the invention is not intended to be limited to the specific terminology. Furthermore, while a specific exemplary embodiment and its variations are discussed, it should be understood that this is done for illustration purposes only. A person skilled in the relevant art will recognize that other components and configurations can be used without departing from the spirit and scope of the invention.

Figure 1:
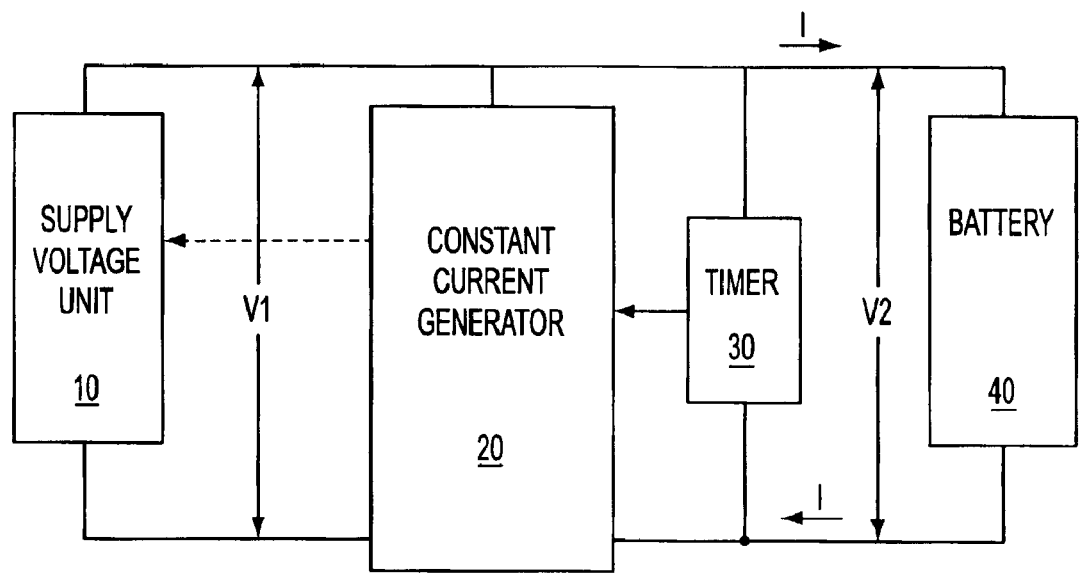
FIG. 1 depicts a schematic block diagram of a battery charger according to an exemplary embodiment of the present invention.

FIG. 1 depicts a schematic block diagram of a battery charger according to an exemplary embodiment of the present invention. The battery charger of FIG. 1 includes a supply voltage unit 10, a constant current generator 20, and a timer 30. The supply voltage unit 10 furnishes a voltage V1 to the constant current generator 20, and the constant current generator 20 supplies a substantially constant current I to a battery 40. A substantially constant current is a constant current whose level is regulated to be no less than 50% and no greater than 150% of a desired current level. Timer 30 has an output coupled to a control input of constant current generator 20. Constant current generator 20 adjusts a magnitude of the substantially constant current I in response to the output of timer 30.

The constant current generator 20 can be any means for outputting a substantially constant current in response to an application of the power supply voltage V1 from the supply voltage unit 10. Exemplary implementations of constant current generator 20 include a current mirror, a current and/or voltage regulator, and any other constant current generator. The constant current generator 20 may further comprise a detector that detects the substantially constant current I. The detector can be any means for detecting the substantially constant current I and for providing an associated output, including a voltage sensor, a current sensor, or any other such sensor. The detector output can be any signal, including a light signal, a voltage signal, and/or a current signal.

The constant current generator 20 changes the substantially constant current I from a first current level to a second current level in response to a timer output from the timer 30. The first current level will generally be greater than the second current level. The first current level of the substantially constant current I is determined based on values of the components of the constant current generator and on characteristics of the particular battery to be (re)charged. It may be set at any desired value, including about 1–8 C (i.e., a current rate equal to about one to eight times the rated capacity of the battery 40). The second current level can be set at any desired value, including about 0.05–7 C (i.e., a current rate equal to about 0.05 to seven times the rated capacity of the battery 40).

The timer 30 can be any means for outputting a timer output after a substantially fixed time delay from a time that the power supply voltage V1 exceeds a substantially fixed threshold voltage. Exemplary implementations may include a 555 timer, a 7242 timer, and a resistor-capacitor-combination timer. A substantially fixed time delay is a time delay whose time period is no less than 50% and no greater than 150% of a desired fixed time delay period. The substantially fixed time delay period can be any time period greater than zero, including, for example, one second, two minutes, and two hours. A substantially fixed threshold voltage is a threshold voltage whose voltage level is no less than 50% and no greater than 150% of a desired fixed threshold voltage level. The desired fixed threshold voltage level can be any voltage, including a negative voltage or a positive voltage, and may be, for example, 1 V, 4.5 V, 8 V, or 14 V.

The supply voltage unit 10 can be any means for supplying a voltage to a battery including a PWM controller-based power source, an AC-DC rectifier, AC-DC-AC-DC converter, a DC-DC voltage divider, etc. In an exemplary implementation, the supply voltage unit 10 can be any means that converts an AC input supply to a DC supply. The supply voltage unit 10 can receive a current detector output of the constant current generator 20 and can adjust the power supply voltage V1 so that the substantially constant current I is maintained near a constant value. The power supply voltage V1 supplied from the supply voltage unit 10 may be time varying and may be any voltage, including a negative voltage or a positive voltage, such as 1 V, 4.5 V, 8 V, or 14 V. For example, the power supply voltage V1 may be about 13–18 volts when the battery 40 is a 12-volt battery and about 7–10 volts when the battery 40 is a 6-volt battery. The power supply voltage V1 may be initially below the substantially fixed threshold voltage of the timer 30 and subsequently exceed the same or vice versa.

The battery 40 can be one or more rechargeable batteries, for example, lithium batteries, NiMH batteries, NiCad batteries, and lead acid batteries.

Figure 2:
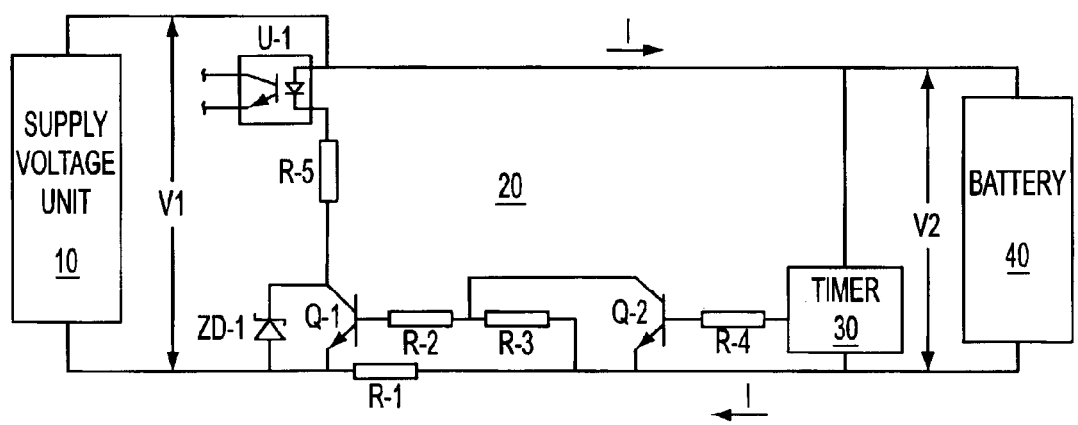
FIG. 2 depicts a partial block circuit diagram of an exemplary implementation of the exemplary embodiment of FIG. 1.

FIG. 2 depicts a diagram of an exemplary implementation of constant current generator 20. It is noted that all of the above description of the battery charger in FIG. 1 is applicable to the circuit of FIG. 2 except where any inconsistencies may arise.

In the exemplary implementation shown in FIG. 2, constant current generator 20 includes a first resistance element R-1 having a first terminal coupled to the power supply voltage V1 output by supply voltage unit 10 and a second terminal coupled to rechargeable battery 40. FIG. 2 further includes a current detector comprising opto-isolator U-1, resistance element R-5, and Zener diode ZD-1 connected in series across the terminals of supply voltage unit 10. Zener diode ZD-1 may be any Zener diode having an appropriate breakdown voltage for its intended purpose (e.g., 6V or 12V). The current detector in FIG. 2 further includes a transistor Q-1 having a first terminal coupled to the first terminal of resistance element R-1, a second terminal coupled to an intervening node between Zener diode ZD-1 and resistance element R-5, and a third (control) terminal coupled to the second terminal of resistance element R-1 via resistance elements R-2 and R-3.

The current detector shown in FIG. 2 also includes a resistance reduction device for reducing a resistance between the terminals of resistance element R-3. The resistance reduction device can be any means for reducing a resistance across a resistance element, including a current source, a transistor-activated parallel load, or a shunting transistor (in other words, an alternate path that at least partially bypasses resistance element R-3). In the example of FIG. 2, a second transistor Q-2 is coupled across the terminals of resistance element R-3 as a shunting transistor. The second transistor Q-2 has its control terminal coupled to timer 30 to receive the timer output via a resistance element R-4.

The components described above may be any appropriate components. For example, the opto-isolator U-1 may comprise an LED and a photo-transistor. The first and second transistors Q-1 and Q-2 may be any combination of transistors, including NMOSFETs, PMOSFETs, JFETs, N-type BJTs, P-type BJTs, and thin film transistors.

The operation of the exemplary battery charger of FIG. 2 is as follows. The supply voltage unit 10 provides a current that flows through the light emitting diode of the opto-isolator U-1, resistance element R-5 and the Zener diode ZD-1. The Zener diode ZD-1 will preferably be in its reverse-breakdown mode when the power supply voltage V1 is of a sufficient magnitude to charge/recharge the battery 40. The current through the LED of opto-isolator U-1 causes the LED to emit light, the intensity of which is controlled by the magnitude of the current through the LED. The light emitted by the LED is detected by the photo transistor of the opto-isolator U-1, whose conductance is proportional to the intensity of the light detected.

When the second terminal of resistance element R-1 is coupled to the battery 40, resistance element R-1 conducts a current proportional to the substantially constant current I. The substantially constant current I flows through resistance element R-1 and another current branch formed of resistance elements R-2 and R-3 and the first transistor Q-1. Because a normal gain of the transistor Q-1 is usually large, the current through resistance element R-1 is almost equal to the substantially constant current I. As the substantially constant current I flows, a voltage differential is created across resistance element R-1, and the voltage differential is divided by the resistance elements R-2 and R-3 and a resistance of first transistor Q-1 to create a control voltage at the control terminal of first transistor Q-1. The control voltage at the control terminal of the first transistor Q-1 is proportional to the voltage differential created across resistance element R-1 and reaches a turn-on voltage (e.g., a transistor's diode drop voltage) when the substantially constant current I is of a sufficient magnitude. When the first transistor Q-1 is turned on, it increases the current flowing through the LED of the opto-isolator U-1. This increased current causes the intensity of the light emitted by the LED to increase, and as a result, the conductivity of the photo transistor of the opto-isolator U-1 also increases. The increased conductivity of the photo transistor is detected by the supply voltage unit 10, which is coupled to the photo transistor, and the supply voltage unit 10 causes the power supply voltage V1 to decrease. The decrease in the power supply voltage V1 causes the substantially constant current I to decrease, and the decrease in the substantially constant current I causes the control voltage at the control terminal of the first transistor Q-1 to decrease (which, in turn, will lead to an increase in the power supply voltage V1 and the substantially constant current I). The above-described operation of the constant current generator 20 is constantly repeated to maintain substantially constant current I near a constant value in an oscillatory manner.

When the timer 30 outputs a timer output via resistance element R-4, the resistance reduction device (e.g., transistor Q-2) turns on and reduces the impedance between the terminals of resistance element R-3, as discussed above. The decreased impedance between the terminals of resistance element R-3, in turn, causes an increase in the control voltage of the control terminal of the first transistor Q-1. This increase in the control voltage of the control terminal of the first transistor Q-1, in turn, increases the conductance of the photo transistor of the opto-isolator U-1 in the manner described above. Accordingly, supply voltage unit 10 decreases the power supply voltage V1, which reduces the substantially constant current I from a first current level to a second current level. In other words, by this adjustment, a new constant current level (i.e., the second current level) is set, and the substantially constant current I will oscillate near the new constant current level in the manner described above.

By being able to adjust the charging current rate during the charging cycle, the inventive battery charger is able to provide a high charging current initially until the battery reaches a certain voltage range. After that point, the charger provides a lower current based on a timer output. By having the described charging process, the battery charger can provide a quick charging so that the battery can be useful after only a relatively short period, e.g., 30 minutes to an hour, of charging. For example, the battery charger can be used in jump starters for cars and in rechargeable spotlights to provide quick charging without incurring detrimental effects, e.g., overheating, usually associated with other conventional quick charging methods.

When implemented using the inventive techniques, jump starters have been built that are able to start a vehicle after only about 30 minutes of charging. Similarly, when spotlights were implemented with the inventive battery charger, the available run times obtained after a short charge period became longer by more than four times the available run times obtained after the same charge period with conventional battery chargers.

The battery charger described above in connection with FIGS. 1–2 can be used in any tool or appliance, including one using a so-called "wall cube" (i.e., a small AC to DC adapter that plugs directly into a wall socket and typically looks like a box with a wire coming out of it for coupling to a (battery-powered) device). The inventive battery charger can be used in jump starters for cars, in spotlights, and in any other rechargeable battery-operated device that can use quick recharging. The inventive battery charger can be used internally within a device or as an external unit.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A battery charger comprising:
   a supply voltage unit providing a power supply voltage;
   a constant current generator receiving the power supply voltage and outputting a substantially constant current, the substantially constant current being adapted for application to a battery; and
   a timer coupled to the power supply voltage, the timer responsive to the power supply voltage and outputting a timer output to an input of the constant current generator;
   wherein the constant current generator changes a magnitude of the power supply voltage in response to the timer output so that the substantially constant current is changed from a first current level to a second current level.

2. The battery charger of claim 1, wherein the timer outputs the timer output following a substantially fixed time delay after a transition of the power supply voltage above a substantially fixed threshold voltage.

3. The battery charger of claim 1, wherein the constant current generator reduces the magnitude of the power supply voltage in response to the timer output, and the first current level is higher than the second current level.

4. The battery charger of claim 1, wherein the constant current generator comprises:
   a resistance element having a first terminal coupled to the supply voltage unit and a second terminal coupled to the battery; and
   a current detector coupled to the resistance element for detecting the substantially constant current and outputting a current detector output, wherein an output of the current detector is supplied to the supply voltage unit.

5. The battery charger of claim 4, wherein the supply voltage unit is adapted to being coupled to an AC input, the supply voltage unit converting the AC input to a DC output that is the power supply voltage.

6. The battery charger of claim 5, wherein the supply voltage unit comprises a pulse width modulation (PWM) controller, the PWM controller being responsive to a change in the current detector output to adjust the power supply voltage so that the substantially constant current is maintained near a constant value.

7. The battery charger of claim 4, wherein the current detector comprises a transistor having first and second main terminals coupled across the supply voltage unit, and wherein the resistance element is coupled between a control terminal and the first main terminal of the transistor.

8. The battery charger of claim 7, wherein the current detector further comprises:
   a second resistance element coupled between the control terminal and the first main terminal of the transistor; and
   a resistance reduction device for reducing a resistance between terminals of the second resistance element in response to the timer output.

9. A method of charging a battery comprising:
   supplying a power supply voltage;
   outputting a substantially constant current in response to the power supply voltage, the substantially constant current being applied to the battery;
   providing a timer output in response to a transition in the power supply voltage; and
   changing a magnitude of the power supply voltage in response to the timer output so that the substantially constant current is changed from a first current level to a second current level.

10. The method of claim 9, wherein the step of providing a timer output comprises the step of generating a timer output after a substantially fixed time delay following a transition of the power supply voltage above a substantially fixed threshold.

11. The method of claim 9, further comprising reducing the magnitude of the power supply voltage in response to the timer output, wherein the first current level is higher than the second current level.

12. The method of claim 9, further comprising:
   detecting the substantially constant current and outputting a corresponding detector output; and
   using the current detector output to control the power supply voltage.

13. The method of claim 12, wherein the step of supplying a power supply voltage comprises the step of converting an AC input to a DC output, the DC output being the power supply voltage.

14. The method of claim 13, wherein the step of converting an AC input to a DC output comprises the steps of:
   converting the AC input supply to the DC output using pulse width modulation (PWM) techniques; and
   adjusting the DC output in response to the current detector output so that the substantially constant current is maintained near a constant value.

15. A battery charger comprising:

means for supplying a power supply voltage;

means for outputting a substantially constant current in response to the power supply voltage, the substantially constant current being applied to a battery; and means for outputting a timer output after a substantially fixed time delay from a time that the power supply voltage exceeds a substantially fixed threshold voltage, wherein the means for outputting a substantially constant current changes the substantially constant current from a first current level to a second current level in response to the timer output.

16. The battery charger of claim 15, wherein the first current level is higher than the second current level.

17. The battery charger of claim 15, wherein the means for outputting a substantially constant current comprises:

means for detecting the substantially constant current and outputting a current detector output, wherein the current detector output changes in response to a fluctuation of the substantially constant current from a constant value, and wherein the means for supplying is responsive to the current detector output.

18. The battery charger of claim 17, wherein the means for supplying comprises means for converting an AC input to a DC output, the DC output being output as the power supply voltage.

19. The battery charger of claim 18, wherein the means for supplying comprises means for adjusting the power supply voltage in response to the current detector output so that the substantially constant current is maintained near a constant value.

20. The battery charger of claim 15, wherein the power supply voltage is decreased in magnitude in response to the timer output.

* * * * *